(12) United States Patent
Lee (10) Patent No.: US 8,301,346 B2
(45) Date of Patent: Oct. 30, 2012

(54) TRAVELING SYSTEM FOR CONSTRUCTION EQUIPMENT

(75) Inventor: Jae Hoon Lee, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 726 days.

(21) Appl. No.: 12/409,842

(22) Filed: Mar. 24, 2009

(65) Prior Publication Data

US 2009/0248259 A1 Oct. 1, 2009

(30) Foreign Application Priority Data

Mar. 27, 2008 (KR) ......................... 10-2008-0028444

(51) Int. Cl.
*G06F 19/00* (2011.01)
(52) U.S. Cl. ........................................ 701/50
(58) Field of Classification Search ....................... 701/50
See application file for complete search history.

(56) References Cited

U.S. PATENT DOCUMENTS

| | | | |
|---|---|---|---|
| 5,784,883 A * | 7/1998 | Ohkura et al. | 60/327 |
| 6,182,448 B1 | 2/2001 | Ohkura et al. | |
| 6,220,028 B1 * | 4/2001 | Ishikawa et al. | 60/431 |
| 6,226,987 B1 | 5/2001 | Hayashi et al. | |
| 6,336,518 B1 * | 1/2002 | Matsuyama | 180/306 |
| 6,558,072 B2 * | 5/2003 | Staffenhagen et al. | 404/117 |
| 6,938,719 B2 * | 9/2005 | Ishimaru et al. | 180/305 |
| 7,886,862 B2 * | 2/2011 | Tatsuno et al. | 180/306 |
| 2003/0014170 A1 * | 1/2003 | Christensen et al. | 701/50 |

FOREIGN PATENT DOCUMENTS

| | | |
|---|---|---|
| EP | 0 735 298 | 10/1996 |
| EP | 1 321 697 | 6/2003 |
| EP | 1 676 964 | 7/2006 |

* cited by examiner

*Primary Examiner* — Thomas B Will
*Assistant Examiner* — Joel F. Mitchell
(74) *Attorney, Agent, or Firm* — Ladas & Parry LLP

(57) ABSTRACT

A traveling system for construction equipment is provided, which can secure an initial traveling manipulability regardless of a low-speed traveling or a high-speed traveling. If the high-speed traveling is selected and the traveling is manipulated, the inclination angle of a swash plate of a hydraulic pump is variably controlled, so that the discharge flow rate of the hydraulic pump exceeds a predetermined flow rate in comparison to the low-speed traveling.

17 Claims, 6 Drawing Sheets

TRAVELING SYSTEM FOR CONSTRUCTION EQUIPMENT

CROSS-REFERENCE TO RELATED APPLICATION

This application is based on and claims priority from Korean Patent Application No. 10-2008-28444, filed on Mar. 27, 2008 in the Korean Intellectual Property Office, the disclosure of which is incorporated herein in its entirety by reference.

BACKGROUND OF THE INVENTION

1. Field of the invention

The present invention relates to a traveling system for construction equipment, which can secure an initial traveling manipulability regardless of a low-speed traveling (i.e. a first-speed traveling in which an inclination angle of a swash plate of a hydraulic motor becomes maximum) or a high-speed traveling (i.e. a second-speed traveling in which an inclination angle of a swash plate of a hydraulic motor becomes minimum) in accordance with an operator's manipulation of a traveling speed selection switch.

More particularly, the present invention relates to a traveling system for construction equipment, which can improve an initial fine manipulability by compensating for a part where a driving pressure is increased through relative increase of hydraulic fluid being supplied to a driving motor in comparison to a low-speed traveling of a traveling device when a high-speed traveling of the traveling device is selected.

2. Description of the Prior Art

Figure 1:
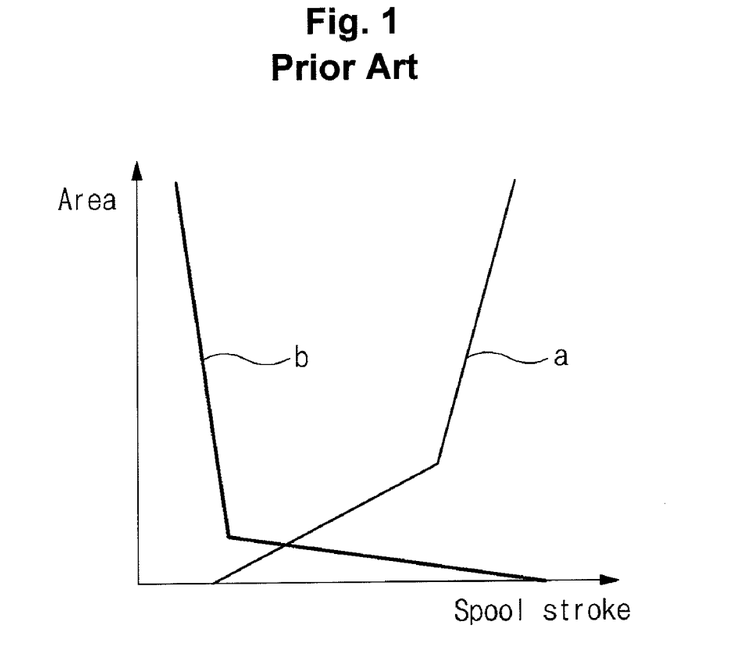
FIG. 1 is a graph indicating the correlation between an open area and a stroke of a traveling spool in a conventional traveling system.
Figure 2:
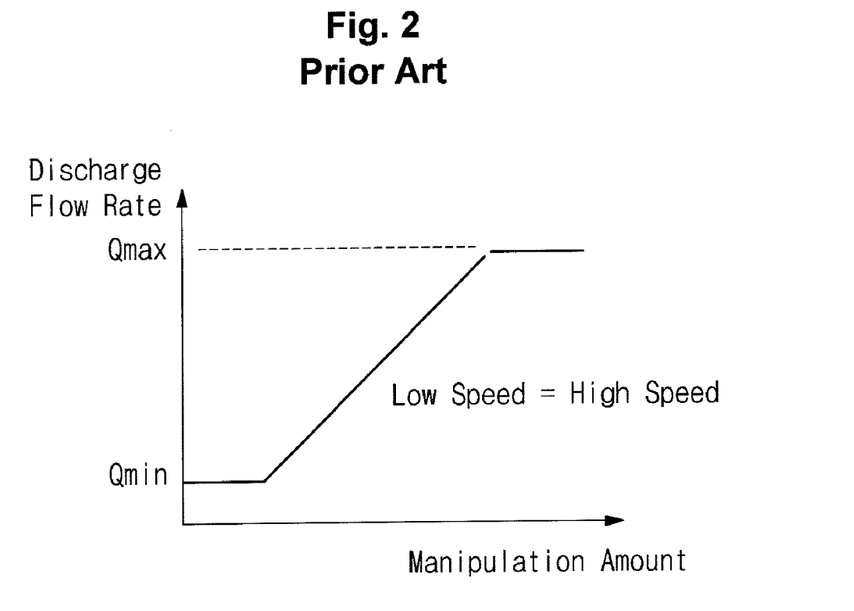
FIG. 2 is a graph indicating a discharge flow rate of a hydraulic pump according to a manipulation amount in a conventional traveling system.

As illustrated in FIGS. 1 and 2, according to a conventional traveling system for construction equipment, a traveling spool for controlling hydraulic fluid being supplied to a traveling motor has the same open area regardless of a low-speed traveling or a high-speed traveling of the construction equipment. Also, the discharge flow rate of a hydraulic pump that supplies the hydraulic fluid to the traveling motor is in proportion to the manipulation amount of a manipulation lever regardless of the traveling speed of the construction equipment.

In this case, a curve "a" indicates an open area for each stroke of the traveling spool for controlling the flow rate of hydraulic fluid being supplied from the hydraulic pump to the traveling motor, and "b" indicates an open area for each stroke of the traveling spool for controlling the flow rate of the hydraulic fluid returning from the hydraulic pump to the hydraulic tank.

On the other hand, in the case of the low-speed traveling of the construction equipment, relatively high torque is generated in comparison to the high-speed traveling. That is, in the case of the low-speed traveling, relatively low driving pressure is generated in comparison to the high-speed traveling, and thus the load pressure is increased at the second traveling speed rather than at the first traveling speed.

Accordingly, in order to move the construction equipment, it is required to further increase the manipulation amount of the manipulation lever in the case of the second-speed traveling, and in this case, it is required to further increase the supply flow rate of hydraulic fluid being supplied to the traveling motor in comparison to the case of the first-speed traveling. In this case, since the start of the construction equipment is made contrary to the intention of an operator who manipulates the manipulation lever, the initial manipulability is lowered.

Due to this, if the open area of the traveling spool is designed to match the low-speed traveling of the construction equipment, pilot signal pressure is heightened at an initial state where the construction equipment starts its traveling in the case of the high-speed traveling of the construction equipment.

By contrast, if the open area of the traveling spool is designed to match the high-speed traveling of the construction equipment, the initial fine manipulation becomes sensitive in the case of the low-speed traveling of the construction equipment.

SUMMARY OF THE INVENTION

Accordingly, the present invention has been made to solve the above-mentioned problems occurring in the prior art while advantages achieved by the prior art are maintained intact.

One object of the present invention is to provide a traveling system for construction equipment, which can improve an initial fine manipulability during a low-speed traveling or a high-speed traveling of the construction equipment in accordance with an operator's selection of a traveling speed selection switch, and thus can provide convenience to the operator.

In order to accomplish this object, there is provided a traveling system for construction equipment, according to an embodiment of the present invention, which includes a variable-displacement hydraulic pump and a pilot pump connected to an engine; a variable-displacement traveling motor connected to the hydraulic pump; a traveling speed selection switch selecting any one of a low-speed traveling and a high-speed traveling of the construction equipment; a solenoid valve installed in a flow path between the pilot pump and the traveling motor to be shifted to control an inclination angle of a swash plate of the traveling motor in accordance with a signal inputted from the traveling speed selection switch; a traveling spool installed in a flow path between the hydraulic pump and the traveling motor to be shifted to control a start, a stop, and a direction change of the traveling motor; a traveling manipulator installed in a flow path between the pilot pump and the traveling spool to control signal pressure being applied to shift the traveling spool; a manipulation amount sensor sensing a manipulation amount of the traveling manipulator and outputting a detection signal; an electro-proportional control valve variably controlling a discharge flow rate of the hydraulic pump by controlling an inclination angle of a swash plate of the hydraulic pump in proportion to an electric signal inputted from an outside; and a controller outputting the electric signal to the electro-proportional control valve; wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling.

A pressure sensor may be used as the manipulation amount sensor.

A hydraulic pressure reducing valve may be used as the traveling manipulator.

In another aspect of the present invention, there is provided a traveling system for construction equipment, which includes a variable-displacement hydraulic pump and a pilot pump connected to an engine; a variable-displacement traveling motor connected to the hydraulic pump; a traveling speed selection switch selecting any one of a low-speed traveling and a high-speed traveling of the construction equipment; a solenoid valve installed in a flow path between the pilot pump and the traveling motor to be shifted to control an inclination angle of a swash plate of the traveling motor in accordance with a signal inputted from the traveling speed selection switch; a traveling spool installed in a flow path between the hydraulic pump and the traveling motor to be shifted to control a start, a stop, and a direction change of the traveling motor; a traveling manipulator outputting a control signal to shift the traveling spool; an electro-proportional control valve variably controlling a discharge flow rate of the hydraulic pump by controlling an inclination angle of a swash plate of the hydraulic pump in proportion to an electric signal inputted from an outside; an electro-proportional control valve for the traveling spool installed in a flow path between a controller and the traveling spool to apply a second signal pressure, which is in proportion to the electric signal inputted from the controller to correspond to a manipulation amount of the traveling manipulator, to the traveling spool; and the controller outputting the electric signal to the electro-proportional control valve and the electro-proportional control valve for the traveling spool; wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling.

An electric valve may be used as the traveling manipulator.

The traveling system for construction equipment according to another embodiment of the present invention may further include a potentiometer installed in the traveling manipulator to sense the manipulation amount of the traveling manipulator and to output a detection signal.

In the traveling system for construction equipment according to an embodiment of the present invention, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump becomes maximum Qmax at a manipulation amount Pi-max the discharge flow rate of the hydraulic pump becomes maximum.

In the traveling system for construction equipment according to another embodiment of the present invention, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump is proportionally increased in accordance with the manipulation amount of the traveling manipulator at the same angle a as in the low-speed traveling.

In the traveling system for construction equipment according to still another embodiment of the present invention, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump becomes maximum Qmax at a manipulation amount Pa that is lower than a manipulation amount Pi-max the discharge flow rate of the hydraulic pump becomes maximum Qmax by the predetermined flow rate.

In the traveling system for construction equipment according to still another embodiment of the present invention, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump becomes maximum Qmax at a manipulation amount Pi-max the discharge flow rate of the hydraulic pump becomes maximum Qmax.

In the traveling system for construction equipment according to still another embodiment of the present invention, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump is proportionally increased in accordance with the manipulation amount of the traveling manipulator at the same angle a as in the low-speed traveling.

In the traveling system for construction equipment according to still another embodiment of the present invention, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump becomes maximum Qmax at a manipulation amount Pa that is lower than a manipulation amount the discharge flow rate of the hydraulic pump becomes maximum Qmax by the predetermined flow rate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
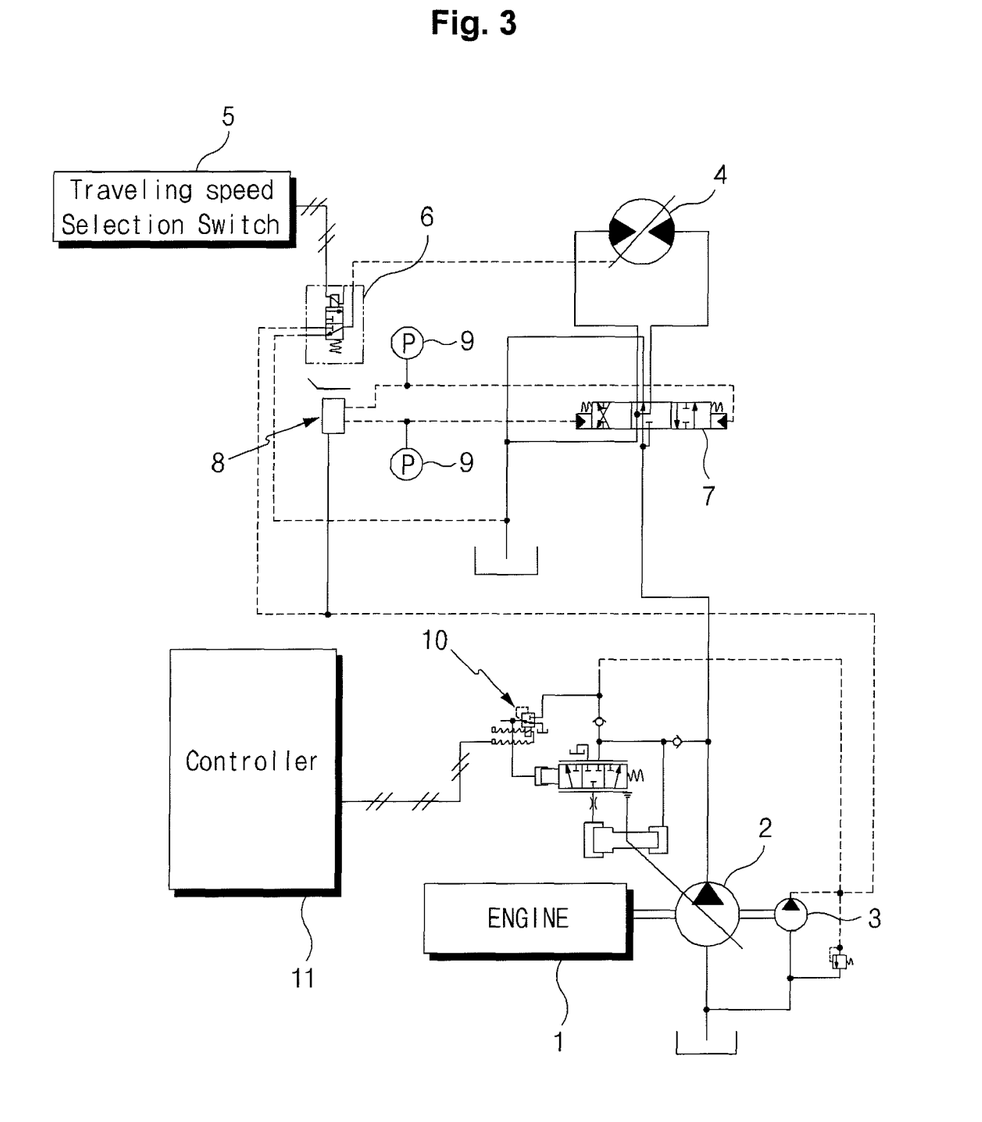
FIG. 3 is a hydraulic circuit diagram of a hydraulic traveling system for construction equipment according to an embodiment of the present invention.

As illustrated in FIG. 3, a traveling system for construction equipment according to an embodiment of the present invention includes a variable-displacement hydraulic pump 2 and a pilot pump 3 connected to an engine 1; a variable-displacement traveling motor 4 connected to the hydraulic pump 2; a traveling speed selection switch 5 selecting any one of a low-speed (i.e. first-speed) traveling and a high-speed (i.e. second-speed) traveling of the construction equipment; a solenoid valve 6 installed in a flow path between the pilot pump 3 and the traveling motor 4 to be shifted to control an inclination angle of a swash plate of the traveling motor 4 in accordance with a signal inputted from the traveling speed selection switch 5; a traveling spool 7 installed in a flow path between the hydraulic pump 2 and the traveling motor 4 to be shifted to control a start, a stop, and a direction change of the traveling motor 4 in accordance with a pilot signal pressure being supplied from the pilot pump 3; a traveling manipulator 8 installed in a flow path between the pilot pump 3 and the traveling spool 7 to control the signal pressure being applied to shift the traveling spool 7; a manipulation amount sensor 9 installed in a flow path between the traveling manipulator 8 and the traveling spool 7 to sense the manipulation amount of the traveling manipulator 8 and outputting a detection signal to a controller 11; an electro-proportional control valve 10 variably controlling a discharge flow rate of the hydraulic pump 2 by controlling an inclination angle of a swash plate of the hydraulic pump 2 in proportion to an electric signal inputted from an outside; and the controller 11 outputting the electric signal to the electro-proportional control valve 10; wherein, if the controller 11 senses that the high-speed traveling is selected by the traveling speed selection switch 5 and the traveling is manipulated by the traveling manipulator 8, the inclination angle of the swash plate of the hydraulic pump 2 is variably controlled to be in proportion to the electric signal outputted from the controller 11, so that the discharge flow rate of the hydraulic pump 2 exceeds a predetermined flow rate in comparison to the case of the low-speed traveling.

A pressure sensor may be used as the manipulation amount sensor 9.

A hydraulic pressure reducing valve (e.g. a traveling pedal) may be used as the traveling manipulator 8.

Hereinafter, an operation of the traveling system for construction equipment according to an embodiment of the present invention will be described with reference to the accompanying drawings.

As illustrated in FIG. 3, if an operator selects a high-speed traveling by manipulating the traveling speed selection switch 5, a selection signal for the high-speed traveling is inputted to the controller 11. At this time, an electric signal is inputted to the solenoid valve 6 to shift an inner spool in lower direction as shown in the drawing.

Accordingly, the inclination angle of the swash plate of the traveling motor 4 is controlled to be in a minimum state by a pilot signal pressure that is discharged from the pilot pump 3 and passes through the solenoid valve 6.

Also, in the case of manipulating the traveling manipulator 8, a traveling manipulation detection signal detected by the manipulation amount sensor 9 (e.g. a pressure sensor) is inputted to the controller 11.

The traveling spool 7 is shifted in proportion to the manipulation amount of the traveling manipulator 8. Also, an electric signal that is proportional to the manipulation amount of the traveling manipulator 8 is inputted from the controller 11 to the electro-proportional control valve 10. The inclination angle of the swash plate of the hydraulic pump 2 is controlled by controlling a regulator through driving of the electro-proportional control valve 10.

Accordingly, the hydraulic fluid discharged from the hydraulic pump 2 in accordance with the manipulation amount of the traveling manipulator 8 is supplied to the traveling motor 4 via the traveling spool 7.

If the controller 11 senses that the high-speed traveling is selected and the traveling is manipulated, the discharge flow rate of the hydraulic pump 2 becomes higher than that in the case of the low-speed traveling in proportion to the electric signal inputted from the controller 11 to the electro-proportional control valve 10.

As described above, the flow rate of hydraulic fluid being discharged from the hydraulic pump 2 in the high-speed traveling of the traveling device can be increased in comparison to that in the case of the low-speed traveling. Accordingly, by increasing the flow rate of hydraulic fluid being supplied from the hydraulic pump 2 to the traveling spool 7 even in the case where the traveling spool 7 has the same open area, the same manipulability as that in the low-speed traveling can be secured during the initial traveling of the traveling device.

That is, if the open area of the traveling spool 7 is designed to match the low-speed traveling of the traveling device, the problem of the conventional traveling system that the pilot signal pressure is increased at the initial state where the construction equipment starts its traveling in the case of the high-speed traveling of the construction equipment.

Figure 4:
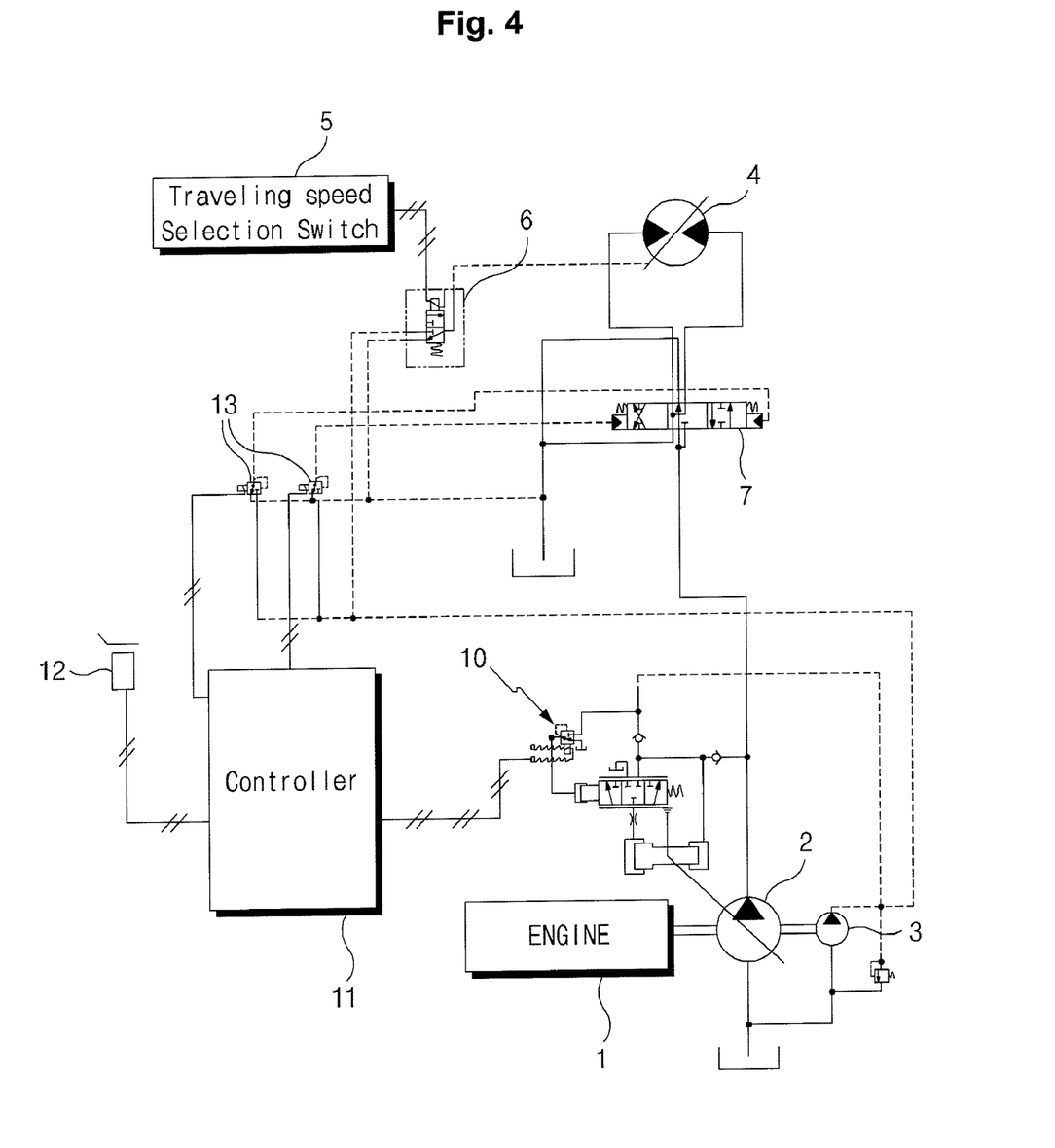
FIG. 4 is a hydraulic circuit diagram of an electric traveling system for construction equipment according to another embodiment of the present invention.

As illustrated in FIG. 4, a traveling system for construction equipment according to anther embodiment of the present invention includes a variable-displacement hydraulic pump 2 and a pilot pump 3 connected to an engine 1; a variable-displacement traveling motor 4 connected to the hydraulic pump 2; a traveling speed selection switch 5 selecting any one of a low-speed traveling and a high-speed traveling of the construction equipment; a solenoid valve 6 installed in a flow path between the pilot pump 3 and the traveling motor 4 to be shifted to control an inclination angle of a swash plate of the traveling motor 4 in accordance with a signal inputted from the traveling speed selection switch 5; a traveling spool 7 installed in a flow path between the hydraulic pump 2 and the traveling motor 4 to be shifted to control a start, a stop, and a direction change of the traveling motor 4 in accordance with a pilot signal pressure being supplied from the pilot pump 3; a traveling manipulator 12 outputting a control signal (i.e. an electric signal) to shift the traveling spool 7; an electro-proportional control valve 10 variably controlling a discharge flow rate of the hydraulic pump 2 by variably controlling an inclination angle of a swash plate of the hydraulic pump 2 in proportion to an electric signal inputted from an outside; and the controller 11 outputting the electric signal to the electro-proportional control valve 10; wherein, if the controller 11 senses that the high-speed traveling is selected by the traveling speed selection switch 5 and the traveling is manipulated by the traveling manipulator 12, the inclination angle of the swash plate of the hydraulic pump 2 is variably controlled to be in proportion to the electric signal outputted from the controller 11, so that the discharge flow rate of the hydraulic pump 2 exceeds a predetermined flow rate in comparison to the low-speed traveling.

An electric valve is used as the traveling manipulator 12.

The traveling system for construction equipment according to another embodiment of the present invention further includes a potentiometer (not illustrated) installed in the traveling manipulator 12 to sense the manipulation amount of the traveling manipulator 12 and to output a detection signal.

The traveling system for construction equipment according to another embodiment of the present invention further includes an electro-proportional control valve 13 for the traveling spool installed in a flow path between the controller 11 and the traveling spool 7 to apply a second signal pressure, which is in proportion to the electric signal inputted from the controller 11 to correspond to a manipulation amount of the traveling manipulator 12, to the traveling spool 7.

Since the above-described construction, except for the electric traveling manipulator 12 outputting the control signal to shift the traveling spool 7, and the electro-proportional control valve 13 for the traveling spool applying the signal pressure corresponding to the manipulation amount of the traveling manipulator 12, is substantially the same as the construction of the traveling system according to an embodiment of the present invention, the detailed description thereof will be omitted. In the following description of the present invention, the same drawing reference numerals are used for the same elements across various figures.

Hereinafter, the operation of the traveling system for construction equipment according to another embodiment of the present invention will be described in detail with reference to the accompanying drawings.

As illustrated in FIG. 4, in the case of selecting a high-speed traveling of the traveling device by the traveling speed selection switch 5, an electric signal is applied to the solenoid valve 6 to shift an inner spool in the lower direction as shown in the drawing. Accordingly, since the pilot signal pressure from the pilot pump 3 is transferred to the traveling motor 4 via the solenoid valve 6, the inclination angle of the swash plate of the traveling motor 4 is controlled to be in a minimum state.

In the case of manipulating the electric traveling manipulator 12 (e.g. an electric valve), a traveling manipulation detection signal is inputted to the controller 11 by a manipulation amount sensing means (e.g. a potentiometer) installed in the traveling manipulator 12.

Accordingly, the electric signal that is in proportion to the manipulation amount of the traveling manipulator 12 is outputted from the controller 11 to the electro-proportional control valve 13 for the traveling spool. Due to this, a second pilot signal pressure, which passes through the electro-proportional control valve 13 for the traveling spool in proportion to the manipulation amount of the traveling manipulator 12, is applied to the traveling spool to shift an inner spool.

That is, the traveling spool 7 is shifted in proportion to the manipulation amount of the traveling manipulator 8. Also, an electric signal that is proportional to the manipulation amount of the traveling manipulator 8 is outputted to the electro-proportional control valve 10 to control the inclination angle of the swash plate of the hydraulic pump 2.

If the controller 11 senses that the high-speed traveling of the traveling device is selected and the traveling is manipulated, the discharge flow rate of the hydraulic pump 2 becomes higher than that in the case of the low-speed traveling in proportion to the electric signal outputted from the controller 11 to the electro-proportional control valve 10.

As described above, the flow rate of hydraulic fluid being discharged from the hydraulic pump 2 in the high-speed traveling of the traveling device can be increased in comparison to that in the case of the low-speed traveling. Accordingly, by increasing the flow rate of hydraulic fluid being supplied from the hydraulic pump 2 to the traveling spool 7 even in the case where the traveling spool 7 has the same open area, the same manipulability as that in the low-speed traveling can be secured during the initial traveling of the traveling device.

That is, if the open area of the traveling spool 7 is designed to match the low-speed traveling of the traveling device, the problem of the conventional traveling system that the pilot signal pressure is increased at the initial state where the construction equipment starts its traveling in the case of the high-speed traveling of the construction equipment.

Figure 5:
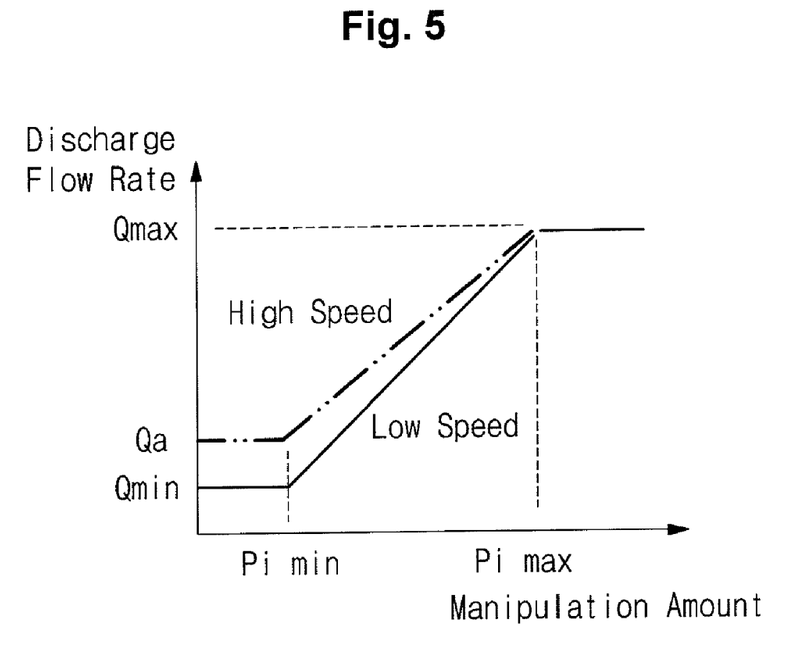
FIG. 5 is a graph indicating a discharge flow rate of a hydraulic pump according to a manipulation amount of a traveling manipulator in a traveling system for construction equipment according to an embodiment of the present invention.

FIG. 5 is a graph indicating a discharge flow rate of a hydraulic pump according to a manipulation amount of a traveling manipulator in a traveling system for construction equipment according to an embodiment of the present invention.

As illustrated in FIG. 5, if the high-speed traveling of the traveling device (as indicated by two-point chain line) is selected by the traveling speed selection switch 5, and the discharge flow rate of the hydraulic pump 2 (as indicated by solid line) set on the basis of the low-speed traveling is controlled, the discharge flow rate of the hydraulic pump 2 is variably controlled in a manner that the discharge flow rate of the hydraulic pump 2 becomes higher than a minimum flow rate Qmin by the predetermined flow rate Qa up to a manipulation amount Pi-min the discharge flow rate of the hydraulic pump 2 starts to increase, and the discharge flow rate of the hydraulic pump 2 becomes maximum Qmax at a manipulation amount Pi-max the discharge flow rate of the hydraulic pump 2 becomes maximum.

Accordingly, the discharge flow rate of the hydraulic pump 2 can be variably controlled so that the discharge flow rate of the hydraulic pump 2 is increased in proportion to the manipulation amount of the hydraulic traveling manipulator 8 or the electric traveling manipulator 12.

Figure 6:
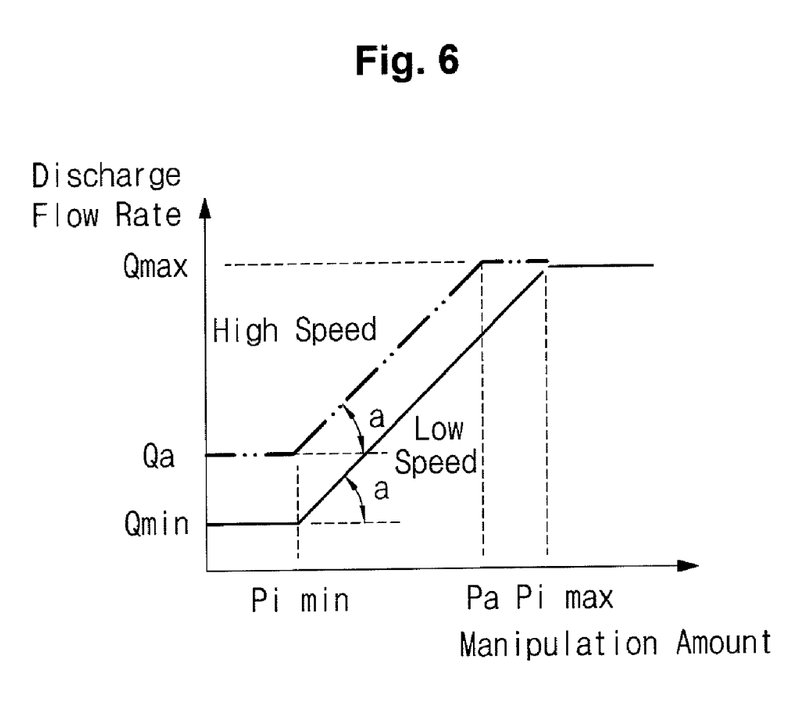
FIG. 6 is a graph indicating a discharge flow rate of a hydraulic pump according to a manipulation amount of a traveling manipulator in a traveling system for construction equipment according to anther embodiment of the present invention.

FIG. 6 is a graph indicating a discharge flow rate of a hydraulic pump according to a manipulation amount of a traveling manipulator in a traveling system for construction equipment according to anther embodiment of the present invention.

As illustrated in FIG. 6, if the high-speed traveling of the traveling device (as indicated by two-point chain line) is selected by the traveling speed selection switch 5, and the discharge flow rate of the hydraulic pump 2 (as indicated by solid line) set on the basis of the low-speed traveling is controlled, the discharge flow rate of the hydraulic pump 2 is variably controlled in a manner that the discharge flow rate of the hydraulic pump 2 becomes higher than a minimum flow rate Qmin by the predetermined flow rate Qa up to a manipulation amount Pi-min the discharge flow rate of the hydraulic pump 2 starts to increase, and the discharge flow rate of the hydraulic pump 2 is proportionally increased in accordance with the manipulation amount of the traveling manipulator 8 at the same angle a as in the low-speed traveling.

Accordingly, the discharge flow rate of the hydraulic pump 2 can be variably controlled so that the discharge flow rate of the hydraulic pump 2 is increased in proportion to the manipulation amount of the hydraulic traveling manipulator 8 or the electric traveling manipulator 12.

Figure 7:
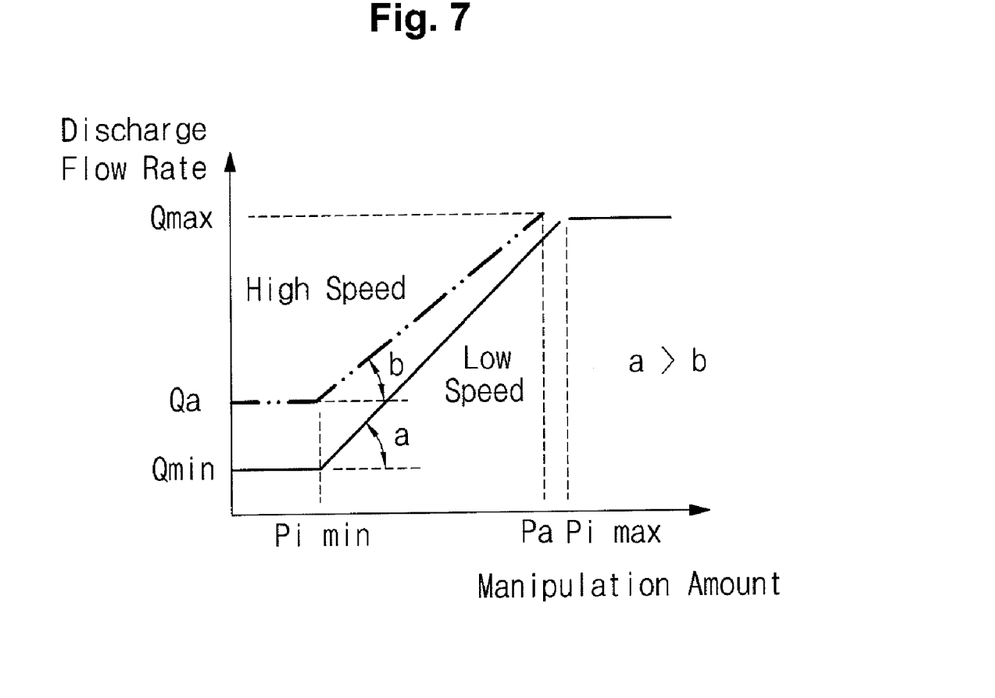
FIG. 7 is a graph indicating a discharge flow rate of a hydraulic pump according to a manipulation amount of a traveling manipulator in a traveling system for construction equipment according to still another embodiment of the present invention.

FIG. 7 is a graph indicating a discharge flow rate of a hydraulic pump according to a manipulation amount of a traveling manipulator in a traveling system for construction equipment according to still another embodiment of the present invention.

As illustrated in FIG. 7, if the high-speed traveling of the traveling device (as indicated by two-point chain line) is selected by the traveling speed selection switch 5, and the discharge flow rate of the hydraulic pump 2 (as indicated by solid line) set on the basis of the low-speed traveling is controlled, the discharge flow rate of the hydraulic pump 2 is variably controlled in a manner that the discharge flow rate of the hydraulic pump 2 becomes higher than a minimum flow rate Qmin by the predetermined flow rate Qa up to a manipulation amount Pi-min the discharge flow rate of the hydraulic pump 2 starts to increase, and the discharge flow rate of the hydraulic pump 2 becomes maximum Qmax at a manipulation amount Pa that is lower than a manipulation amount Pi-max the discharge flow rate of the hydraulic pump 2 becomes maximum Qmax by the predetermined flow rate.

Accordingly, the discharge flow rate of the hydraulic pump 2 can be variably controlled so that the discharge flow rate of the hydraulic pump 2 is increased in proportion to the manipulation amount of the hydraulic traveling manipulator 8 or the electric traveling manipulator 12.

Figure 8:
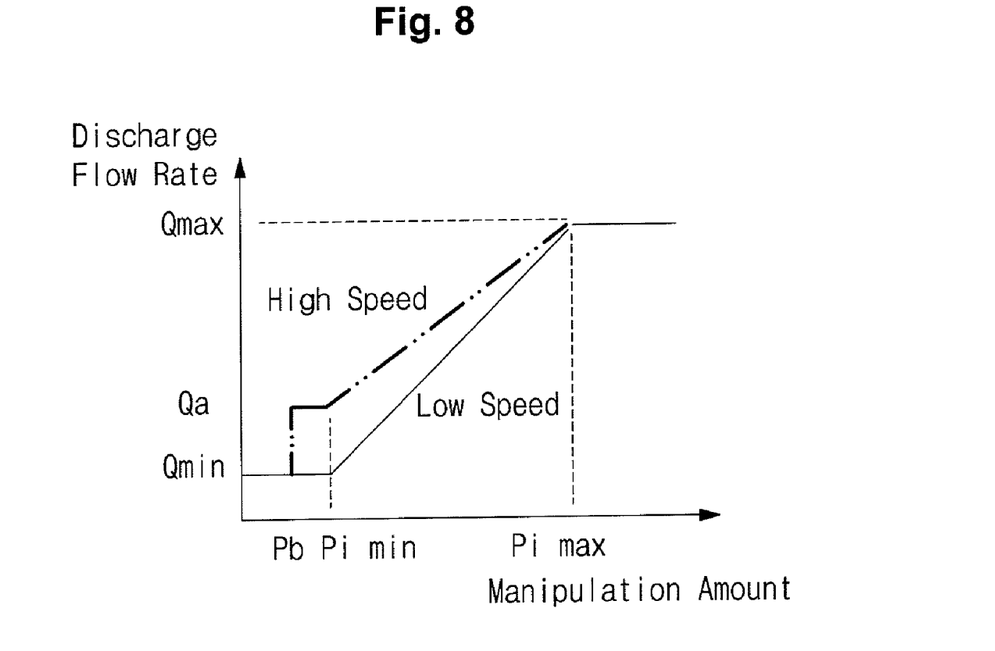
FIG. 8 is a graph indicating a discharge flow rate of a hydraulic pump according to a manipulation amount of a traveling manipulator in a traveling system for construction equipment according to still another embodiment of the present invention.

FIG. 8 is a graph indicating a discharge flow rate of a hydraulic pump according to a manipulation amount of a traveling manipulator in a traveling system for construction equipment according to still another embodiment of the present invention.

As illustrated in FIG. 8, if the high-speed traveling of the traveling device (as indicated by two-point chain line) is selected by the traveling speed selection switch 5, and the discharge flow rate of the hydraulic pump 2 (as indicated by solid line) set on the basis of the low-speed traveling is controlled, the discharge flow rate of the hydraulic pump 2 is variably controlled in a manner that the discharge flow rate of the hydraulic 2 becomes a minimum flow rate Qmin up to a predetermined manipulation amount Pb, the discharge flow rate of the hydraulic pump 2 becomes higher than the minimum flow rate Qmin by the predetermined flow rate Qa from the predetermined manipulation amount Pb up to a manipulation amount Pi-min the discharge flow rate of the hydraulic pump 2 starts to increase, and the discharge flow rate of the hydraulic pump 2 becomes maximum Qmax at a manipulation amount Pi-max the discharge flow rate of the hydraulic pump becomes maximum Qmax.

Accordingly, the discharge flow rate of the hydraulic pump 2 can be variably controlled so that the discharge flow rate of the hydraulic pump 2 is increased in proportion to the manipulation amount of the hydraulic traveling manipulator 8 or the electric traveling manipulator 12.

Figure 9:
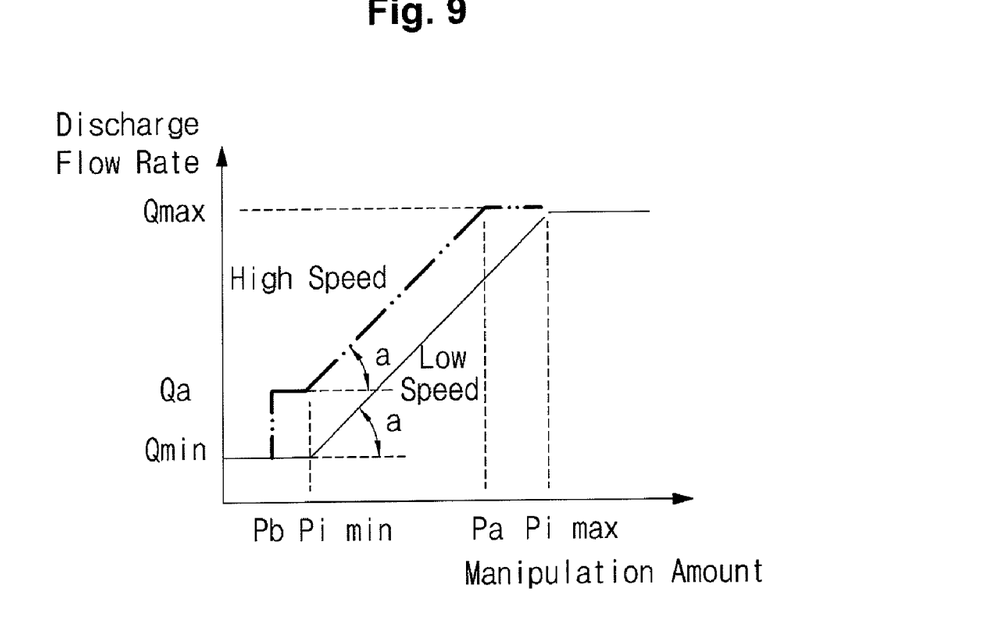
FIG. 9 is a graph indicating a discharge flow rate of a hydraulic pump according to a manipulation amount of a traveling manipulator in a traveling system for construction equipment according to still another embodiment of the present invention.

FIG. 9 is a graph indicating a discharge flow rate of a hydraulic pump according to a manipulation amount of a traveling manipulator in a traveling system for construction equipment according to still another embodiment of the present invention.

As illustrated in FIG. 9, if the high-speed traveling of the traveling device (as indicated by two-point chain line) is selected by the traveling speed selection switch 5, and the discharge flow rate of the hydraulic pump 2 (as indicated by solid line) set on the basis of the low-speed traveling is controlled, the discharge flow rate of the hydraulic pump 2 is variably controlled in a manner that the discharge flow rate of the hydraulic pump 2 becomes a minimum flow rate Qmin up to a predetermined manipulation amount Pb, the discharge flow rate of the hydraulic pump 2 becomes higher than the minimum flow rate Qmin by the predetermined flow rate Qa from the predetermined manipulation amount Pb up to a manipulation amount Pi-min the discharge flow rate of the hydraulic pump 2 starts to increase, and the discharge flow rate of the hydraulic pump 2 is proportionally increased in accordance with the manipulation amount of the traveling manipulator at the same angle a as in the low-speed traveling.

Accordingly, the discharge flow rate of the hydraulic pump 2 can be variably controlled so that the discharge flow rate of the hydraulic pump 2 is increased in proportion to the manipulation amount of the hydraulic traveling manipulator 8 or the electric traveling manipulator 12.

Figure 10:
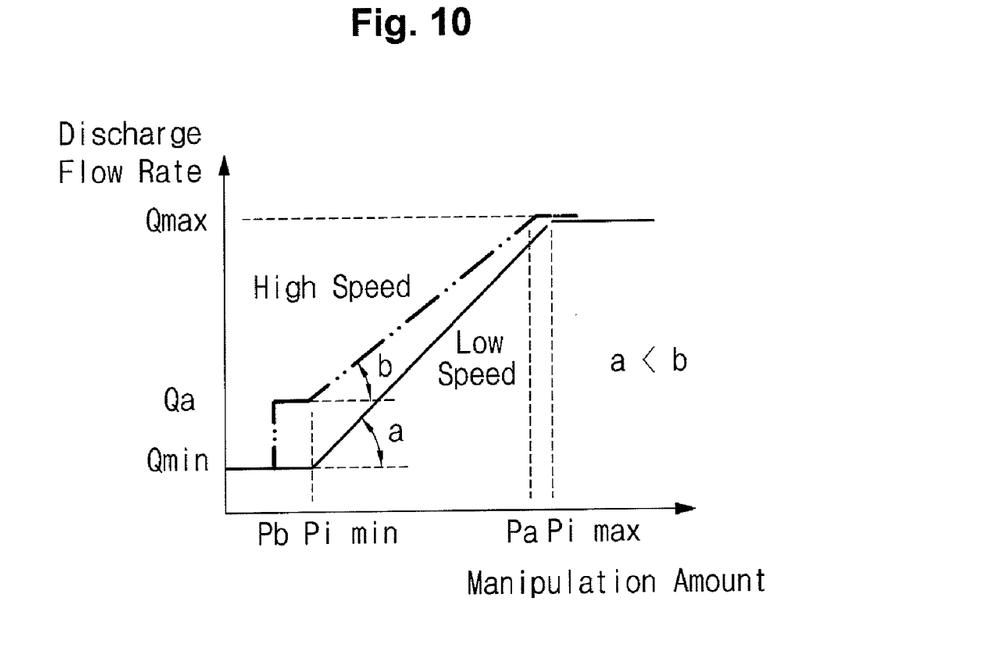
FIG. 10 is a graph indicating a discharge flow rate of a hydraulic pump according to a manipulation amount of a traveling manipulator in a traveling system for construction equipment according to still another embodiment of the present invention.

FIG. 10 is a graph indicating a discharge flow rate of a hydraulic pump according to a manipulation amount of a traveling manipulator in a traveling system for construction equipment according to still another embodiment of the present invention.

As illustrated in FIG. 10, if the high-speed traveling of the traveling device (as indicated by two-point chain line) is selected by the traveling speed selection switch 5, and the discharge flow rate of the hydraulic pump 2 (as indicated by solid line) set on the basis of the low-speed traveling is controlled, the discharge flow rate of the hydraulic pump 2 is variably controlled in a manner that the discharge flow rate of the hydraulic pump 2 becomes a minimum flow rate Qmin up to a predetermined manipulation amount Pb, the discharge flow rate of the hydraulic pump 2 becomes higher than the minimum flow rate Qmin by the predetermined flow rate Qa from the predetermined manipulation amount Pb up to a manipulation amount Pi-min the discharge flow rate of the hydraulic pump 2 starts to increase, and the discharge flow rate of the hydraulic pump 2 becomes maximum Qmax at a manipulation amount Pa that is lower than a manipulation amount the discharge flow rate of the hydraulic pump 2 becomes maximum Qmax by the predetermined flow rate.

Accordingly, the discharge flow rate of the hydraulic pump 2 can be variably controlled so that the discharge flow rate of the hydraulic pump 2 is increased in proportion to the manipulation amount of the hydraulic traveling manipulator 8 or the electric traveling manipulator 12.

As described above, the traveling system for construction equipment according to embodiments of the present invention has the following advantages.

The traveling system for construction equipment according to embodiments of the present invention can improve an initial fine manipulability by increasing the flow rate of hydraulic fluid being supplied to the driving motor in comparison to a low-speed traveling of the traveling device when a high-speed traveling of the traveling device is selected, and thus can provide convenience and reliability to the operator.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A traveling system for construction equipment, comprising:
    a variable-displacement hydraulic pump and a pilot pump connected to an engine;
    a variable-displacement traveling motor connected to the hydraulic pump;
    a traveling speed selection switch selecting any one of a low-speed traveling and a high-speed traveling of the construction equipment;
    a solenoid valve installed in a flow path between the pilot pump and the traveling motor to be shifted to control an inclination angle of a swash plate of the traveling motor in accordance with a signal inputted from the traveling speed selection switch;
    a traveling spool installed in a flow path between the hydraulic pump and the traveling motor to be shifted to control a start, a stop, and a direction change of the traveling motor; a traveling manipulator installed in a flow path between the pilot pump and the traveling spool to control signal pressure being applied to shift the traveling spool;
    a manipulation amount sensor sensing a manipulation amount of the traveling manipulator and outputting a detection signal;
    an electro-proportional control valve variably controlling a discharge flow rate of the hydraulic pump by controlling an inclination angle of a swash plate of the hydraulic pump in proportion to an electric signal inputted from an outside; and
    a controller outputting the electric signal to the electro-proportional control valve;
    wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling wherein, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump becomes maximum Qmax at a manipulation amount Pi-max the discharge flow rate of the hydraulic pump becomes maximum.

2. The traveling system of claim 1, wherein a pressure sensor is used as the manipulation amount sensor.

3. The traveling system of claim 1, wherein a hydraulic pressure reducing valve is used as the traveling manipulator.

4. A traveling system for construction equipment, comprising:
    a variable-displacement hydraulic pump and a pilot pump connected to an engine;
    a variable-displacement traveling motor connected to the hydraulic pump;
    a traveling speed selection switch selecting any one of a low-speed traveling and a high-speed traveling of the construction equipment;
    a solenoid valve installed in a flow path between the pilot pump and the traveling motor to be shifted to control an inclination angle of a swash plate of the traveling motor in accordance with a signal inputted from the traveling speed selection switch;
    a traveling spool installed in a flow path between the hydraulic pump and the traveling motor to be shifted to control a start, a stop, and a direction change of the traveling motor;
    a traveling manipulator outputting a control signal to shift the traveling spool;
    a first electro-proportional control valve variably controlling a discharge flow rate of the hydraulic pump by controlling an inclination angle of a swash plate of the hydraulic pump in proportion to an electric signal inputted from an outside;
    a second electro-proportional control valve for the traveling spool applying a second signal pressure, which is in proportion to the electric signal inputted to correspond to a manipulation amount of the traveling manipulator, to the traveling spool; and
    a controller outputting the electric signal to the first electro-proportional control valve and the second electro-proportional control valve for the traveling spool;
    wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling
    wherein, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump becomes maximum Qmax at a manipulation amount Pi-max the discharge flow rate of the hydraulic pump becomes maximum.

5. The traveling system of claim 4, wherein an electric valve is used as the traveling manipulator.

6. The traveling system of claim 4, further comprising a potentiometer installed in the traveling manipulator to sense the manipulation amount of the traveling manipulator and to output a detection signal.

7. The traveling system of claim 4, wherein the second electro-proportional control valve for the traveling spool is installed in a flow path between the controller and the traveling spool to apply the second signal pressure which is in proportion to the electric signal inputted from the controller to correspond to the manipulation amount of the traveling manipulator.

8. A traveling system for construction equipment, comprising:
 a variable-displacement hydraulic pump and a pilot pump connected to an engine;
 a variable-displacement traveling motor connected to the hydraulic pump;
 a traveling speed selection switch selecting any one of a low-speed traveling and a high-speed traveling of the construction equipment;
 a solenoid valve installed in a flow path between the pilot pump and the traveling motor to be shifted to control an inclination angle of a swash plate of the traveling motor in accordance with a signal inputted from the traveling speed selection switch;
 a traveling spool installed in a flow path between the hydraulic pump and the traveling motor to be shifted to control a start, a stop, and a direction change of the traveling motor; a traveling manipulator installed in a flow path between the pilot pump and the traveling spool to control signal pressure being applied to shift the traveling spool;
 a manipulation amount sensor sensing a manipulation amount of the traveling manipulator and outputting a detection signal;
 an electro-proportional control valve variably controlling a discharge flow rate of the hydraulic pump by controlling an inclination angle of a swash plate of the hydraulic pump in proportion to an electric signal inputted from an outside; and
 a controller outputting the electric signal to the electro-proportional control valve;
 wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling, and
 wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump is proportionally increased in accordance with the manipulation amount of the traveling manipulator at the same angle a as in the low-speed traveling.

9. A traveling system for construction equipment, comprising:
 a variable-displacement hydraulic pump and a pilot pump connected to an engine;
 a variable-displacement traveling motor connected to the hydraulic pump;
 a traveling speed selection switch selecting any one of a low-speed traveling and a high-speed traveling of the construction equipment;
 a solenoid valve installed in a flow path between the pilot pump and the traveling motor to be shifted to control an inclination angle of a swash plate of the traveling motor in accordance with a signal inputted from the traveling speed select switch;
 a traveling spool installed in a flow path between the hydraulic pump and the traveling motor to be shifted to control a start, a stop, and direction change of the traveling motor; a traveling manipulator installed in a flow path between the pilot trump and the traveling spool to control signal pressure being applied to shift the traveling spool;
 a manipulation amount sensor sensing a manipulation amount of the traveling manipulator and outputting a detection signal;
 an electro-proportional control valve variably controlling a discharge flow rate of the hydraulic pump by controlling an inclination angle of a swash plate of the hydraulic pump in proportion to an electric signal inputted from an outside; and
 a controller outputting the electric signal to the electro-proportional control valve;
 wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling, and
 wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump becomes maximum Qmax at a manipulation amount Pa that is lower than a manipulation amount Pi-max the discharge flow rate of the hydraulic pump becomes maximum Qmax by the predetermined flow rate.

10. A traveling system for construction equipment, comprising:
 a variable-displacement hydraulic pump and a pilot pump connected to an engine;
 a variable-displacement traveling motor connected to the hydraulic pump;

a traveling speed selection switch selecting anyone of a low-speed traveling and a high-speed traveling of the construction equipment;
a solenoid valve installed in a flow path between the pilot pump and the traveling motor to be shifted to control an inclination angle of a swash plate of the traveling motor in accordance with a signal inputted from the traveling speed selection switch;
a traveling spool installed in a flow path between the hydraulic pump and the traveling motor to be shifted to control a start, a stop, and a direction change of the traveling motor; a traveling manipulator installed in a flow path between the pilot pump and the traveling spool to control signal pressure being applied to shift the traveling spool;
a manipulation amount sensor sensing a manipulation amount of the traveling manipulator and outputting a detection signal;
an electro-proportional control valve variably controlling a discharge flow rate of the hydraulic pump by controlling an inclination angle of a swash plate of the hydraulic pump in proportion to an electric signal inputted from an outside; and
a controller outputting the electric signal to the electro-proportional control valve;
wherein, if the controller senses that the high-speed traveling is selected by the traveling speed selection switch and the traveling manipulated the traveling manipulator, the inclination angle of the swash plate of tip hydraulic pump is variably controlled to be in proportion to the electric signal outputted from the controller, so that the discharge flow rate of the hydraulic exceeds a predetermined flow rate in comparison to the low-speed traveling, and
wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump becomes maximum Qmax at a manipulation amount Pi-max the discharge flow rate of the hydraulic pump becomes maximum Qmax.

11. A traveling system for construction equipment, comprising:
a variable-displacement hydraulic pump and a pilot pump connected to an engine;
a variable-displacement traveling motor connected to the hydraulic pump;
a traveling speed selection switch selecting any one of a low-speed traveling and a high-speed traveling of the construction equipment;
solenoid valve installed in a flow path between the pilot pump and the traveling motor to be shifted to control an inclination angle of a swash plate of the traveling motor in accordance with a signal inputted from the traveling speed selection switch;
a traveling spool installed in a flow path between the hydraulic pump and the traveling motor to be shifted to control a start, a stop, and a direction change of the traveling motor; a traveling manipulator installed in a flow path between the pilot pump and the traveling spool to control signal pressure being controlled to shift the traveling spool;
a manipulation amount sensor sensing a manipulation amount of the traveling manipulator and outputting a detection signal;
an electro-proportional control valve variably controlling a discharge flow rate of the hydraulic pump by controlling an inclination angle of a swash plate of the hydraulic pump in proportion to an electric signal outputted from an outside; and
a controller outputting the electric signal to the electro-proportional control valve;
wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling,
wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump is proportionally increased in accordance with the manipulation amount of the traveling manipulator at the same angle a as in the low-speed traveling.

12. A traveling system for construction equipment, comprising:
a variable-displacement hydraulic pump and a pilot pump connected to an engine;
a variable-displacement traveling motor connected to the hydraulic pump;
a traveling speed selection switch selecting any one of a low-speed traveling and a high-speed traveling of the construction equipment;
a solenoid valve installed in a flow oath between the pilot pump and the traveling motor to be shifted to control an inclination angle of a swash plate of the traveling motor in accordance with a signal inputted from the traveling speed selection switch;
a traveling spool installed in a flow path between the hydraulic pump and the traveling motor to be shifted to control a start, a stop, and a direction change of the traveling motor; a traveling manipulator installed in a flow oath between the pilot pump and the traveling spool to control signal pressure being applied to shift the traveling spool;
a manipulation amount sensor sensing a manipulation amount of the traveling manipulator and outputting a detection signal;
an electro-proportional control valve variably controlling a discharge flow rate of the hydraulic pump by controlling an inclination angle of a swash plate of the hydraulic pump in proportion to an electric signal inputted from an outside; and a controller outputting the electric signal to the electro-proportional control valve;

wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling, and wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump becomes maximum Qmax at a manipulation amount Pa that is lower than a manipulation amount the discharge flow rate of the hydraulic pump becomes maximum Qmax by the predetermined flow rate.

13. A traveling system for construction equipment, comprising:

a variable-displacement hydraulic pump and a pilot pump connected to engine;

a variable-displacement traveling motor connected to the hydraulic pump;

a traveling speed selection switch selecting any one of a low-speed traveling and a high-speed traveling of the construction equipment;

a solenoid valve installed in a flow path between the pilot pump and the traveling motor to be shifted to control an inclination angle of a swash plate of the traveling motor in accordance with a signal inputted from the traveling speed selection switch;

a traveling spool installed in a flow path between the hydraulic pump and the traveling motor to be shifted to control a start, a stop, and a direction change of the traveling motor;

a traveling manipulator outputting a control signal to shift the traveling spool;

a first electro-proportional control valve variably controlling a discharge flow rate of the hydraulic pump by controlling an inclination angle of a swash plate of the hydraulic pump in proportion to an electric signal inputted from an outside;

a second electro-proportional control valve for the traveling spool applying a second signal pressure, which is in proportion to the electric signal inputted to correspond to a manipulation amount of the traveling manipulator, to the traveling spool; and a controller outputting the electric signal to the first electro-proportional control valve and the second electro-proportional control valve for the traveling spool;

wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling, and wherein, if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump is proportionally increased in accordance with the manipulation amount of the traveling manipulator at the same angle a as in the low-speed traveling.

14. A traveling system for construction equipment, comprising:

a variable-displacement hydraulic pump and a pilot pump connected to an engine;

a variable-displacement traveling motor connected to the hydraulic pump;

a traveling speed selection switch selecting any one of a low-speed traveling and a high-speed traveling of the construction equipment;

a solenoid valve installed in a flow path between the pilot pump and the traveling motor to be shifted to control an inclination angle of a swash plate of the traveling motor in accordance with a signal inputted from the traveling speed selection switch;

a traveling spool installed in a flow path between the hydraulic pump and the traveling motor be shifted to control a start, a stop, and a direction change of the traveling motor;

a traveling manipulator outputting a control signal to shift the traveling spool;

a first electro-proportional control valve variably controlling a discharge flow rate of the hydraulic puma by controlling an inclination angle of a swash plate of the hydraulic pump in proportion to an electric signal inputted from an outside;

a second electro-proportional control valve for the traveling spool applying a second signal pressure, which is in proportion to the electric signal inputted to correspond to a manipulation amount of the traveling manipulator, to the traveling spool; and a controller outputting the electric signal to the first electro-proportional control valve and the second electro-proportional control valve for the traveling spool;

wherein, if the controller senses that the high-speed traveling is selected by traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling, and wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes higher than a minimum flow rate Qmin by the predetermined flow rate Qa up to a manipulation amount Pi-min the discharge flow rate of the hydraulic pump starts to increase, and the discharge flow rate of the hydraulic pump becomes maximum Qmax at a manipulation amount Pa that is lower than a manipulation amount Pi-max the discharge flow rate of the hydraulic pump becomes maximum Qmax by the predetermined flow rate.

15. A traveling system for construction equipment, comprising:
   a variable-displacement hydraulic pump and a pilot pump connected to an engine;
   a variable-displacement traveling motor connected to the hydraulic pump;
   a traveling speed selection switch selecting any one of a low-speed traveling and a high-speed traveling of the construction equipment;
   a solenoid valve installed in a flow path between the pilot pump and the traveling motor to be shifted to control an inclination angle of a swash plate of the traveling motor in accordance with a signal inputted from the traveling speed selection switch;
   a traveling spool installed in a flow path between the hydraulic pump and the traveling motor to be shifted to control a start, a stop, and a direction change of the traveling motor;
   a traveling manipulator outputting a control signal to shift the traveling spool;
   a first electro-proportional control valve variably controlling a discharge flow rate of the hydraulic pump by controlling an inclination angle of a swash plate of the hydraulic pump in proportion to an electric signal inputted from an outside;
   a second electro-proportional control valve for the traveling spool applying a second signal pressure, which is in proportion to the electric signal inputted to correspond to a manipulation amount of the traveling manipulator, to the traveling spool; and
   a controller outputting the electric signal to the first electro-proportional control valve and the second electro-proportional control valve for the traveling spool;
   wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic a predetermined flow rate in comparison low-speed traveling, and
   wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump becomes maximum Qmax at a manipulation amount Pi-max the discharge flow rate of the hydraulic pump becomes maximum Qmax.

16. The traveling system of claim 4, A traveling system for construction equipment, comprising:
   a variable-displacement hydraulic pump and a pilot pump connected to an engine;
   variable-displacement traveling motor connected to the hydraulic pump;
   a traveling speed selection switch selecting any one of a low-speed traveling and a high-speed traveling of the construction equipment;
   a solenoid valve installed in a flow path between the pilot pump and the traveling motor to be shifted to control an inclination angle of a swash plate of the traveling motor in accordance with a signal inputted from the traveling speed selection switch;
   a traveling spool installed in a flow path between the hydraulic pump and the traveling motor to be shifted to control a start, a stop, and a direction change of the traveling motor;
   a traveling manipulator outputting a control signal to shift the traveling spool;
   a first electro-proportional control valve variably controlling a discharge flow rate of the hydraulic pump by controlling an inclination angle of a swash plate of the hydraulic pump in proportion to an electric signal inputted from an outside;
   a second electro-proportional control valve for the traveling spool applying a second signal pressure, which is in proportion to the electric signal outputted to correspond to a manipulation amount of the traveling manipulator, to the traveling spool; and
   a controller outputting the electric signal to the first electro-proportional control valve and the second electro-proportional, control valve for the traveling spool;
   wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling, and
   wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump is proportionally increased in accordance with the manipulation amount of the traveling manipulator at the same angle a as in the low-speed traveling.

17. A traveling system for construction equipment, comprising:
   a variable-displacement hydraulic pump and a pilot pump connected to an engine;

a variable-displacement traveling motor connected to the hydraulic pump;

a traveling speed selection switch selecting any one of a low-speed traveling and a high-speed traveling of the construction equipment;

a solenoid valve installed in a flow path between the pilot pump and the traveling motor to be shifted to control an inclination angle of a swash plate of the traveling motor in accordance with a signal inputted from the traveling speed selection switch;

a traveling spool installed in a flow path between the hydraulic pump and the traveling motor to be shifted to control a start, a stop, and a direction change of the traveling motor;

a traveling manipulator outputting a control signal to shift the traveling spool;

a first electro-proportional control valve variably controlling a discharge flow rate of the hydraulic pump by controlling an inclination angle of a swash plate of the hydraulic pump in proportion to an electric signal inputted from an outside;

a second electro-proportional control valve for the traveling spool applying a second signal pressure, which is in proportion to the electric signal inputted to correspond to a manipulation amount of the traveling manipulator, to the traveling spool; and a controller outputting the electric signal to the first electro-proportional control valve and the second electro-proportional control valve for the traveling spool;

wherein, if the controller senses that the high-speed traveling is selected by the traveling speed selection switch and the traveling is manipulated by the traveling manipulator, the inclination angle of the swash plate of the hydraulic pump is variably controlled to be in proportion to the electric signal outputted from the controller, so that the discharge flow rate of the hydraulic pump exceeds a predetermined flow rate in comparison to the low-speed traveling, and wherein if the high-speed traveling of the traveling device is selected by the traveling speed selection switch, and the discharge flow rate of the hydraulic pump set on the basis of the low-speed traveling is controlled, the discharge flow rate of the hydraulic pump is variably controlled in a manner that the discharge flow rate of the hydraulic pump becomes a minimum flow rate Qmin up to a predetermined manipulation amount Pb, the discharge flow rate of the hydraulic pump becomes higher than the minimum flow rate Qmin by the predetermined flow rate Qa from the predetermined manipulation amount Pb up to a manipulation amount Pi-min the discharge flow rate of the hydraulic pump starts to increase, and the discharge flow rate of the hydraulic pump becomes maximum Qmax at a manipulation amount Pa that is lower than a manipulation amount the discharge flow rate of the hydraulic pump becomes maximum Qmax by the predetermined flow rate.

* * * * *